United States Patent
Cohn et al.

(10) Patent No.: US 9,172,718 B2
(45) Date of Patent: Oct. 27, 2015

(54) ENDPOINT LOAD REBALANCING CONTROLLER

(71) Applicant: International Business Machines Corporation, Armonk, NY (US)

(72) Inventors: John M. Cohn, Richmond, VT (US); Eren Kursun, New York, NY (US); Maharaj Mukherjee, Poughkeepsie, NY (US); Anna Topol, Jefferson Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/036,220

(22) Filed: Sep. 25, 2013

(65) Prior Publication Data

US 2015/0089657 A1   Mar. 26, 2015

(51) Int. Cl.
G06F 21/55 (2013.01)
H04L 29/06 (2006.01)
G06F 21/60 (2013.01)
H04L 9/00 (2006.01)

(52) U.S. Cl.
CPC .......... *H04L 63/1441* (2013.01); *G06F 21/558* (2013.01); *G06F 21/60* (2013.01); *H04L 9/002* (2013.01)

(58) Field of Classification Search
None
See application file for complete search history.

(56) References Cited

U.S. PATENT DOCUMENTS

| | | | |
|---|---|---|---|
| 6,419,159 B1 | 7/2002 | Odinak | |
| 7,171,437 B2 | 1/2007 | Yamaguchi | |
| 8,516,488 B1 * | 8/2013 | Brown et al. | 718/104 |
| 9,031,234 B2 * | 5/2015 | Kawabata et al. | 380/45 |
| 2009/0183157 A1 * | 7/2009 | Tran et al. | 718/100 |
| 2011/0061014 A1 * | 3/2011 | Frader-Thompson et al. | 715/771 |
| 2011/0225560 A1 | 9/2011 | Verbauwhede et al. | |
| 2012/0069997 A1 | 3/2012 | Kawabata et al. | |

FOREIGN PATENT DOCUMENTS

WO   WO2012004597   1/2012

OTHER PUBLICATIONS

Erkin et al., Private Computation of Spatial and Temporal Power Consumption with Smart Meters, Springer-Verlag, Jun. 2012.*
Molina-Markham et al., Private Memoirs of a Smart Meter, ACM, 2010.*
Rial et al., Privacy-Preserving Smart Metering, ACM, 2011.*

(Continued)

*Primary Examiner* — Minh Dinh
(74) *Attorney, Agent, or Firm* — Law Office of Charles W. Peterson, Jr.; Louis J. Percello, Esq.

(57) ABSTRACT

A endpoint load rebalancing controller, method of controlling endpoint activity to suppress side channel variation and computer program product for controlling endpoint activity for suppressing side channel variation in information from utility company users, e.g., from power company endpoints. The load rebalancing controller monitors period to period endpoint service usage and predicts next period endpoint service usage. Whenever the controller maintains determines that the endpoint usage will exhibit a change that may be sufficient to convey activity information in side channel activity, the controller rebalances activity for the next period. Rebalancing may include shifting off-line execution from one period to another and capping or increasing on-line execution activity.

25 Claims, 9 Drawing Sheets

(56) References Cited

OTHER PUBLICATIONS

Sustek, Understanding Smart Meters to Design Intelligent, Secure Systems, EE Times, Aug. 2011.*

Tiri et al., "A VLSI Design Flow for Secure Side-Channel Attack Resistant ICs," Proceedings of the Design, Automation and Test in Europe Conference and Exhibition (Date'05).

Agrawal et al., "The EM Side-Channel(s):Attacks and Assessment Methodologies," Cryptographic Hardware and Embedded Systems—CHES 2002 Lecture Notes in Computer Science vol. 2523, 2003, pp. 29-45.

Tiri et al., "A Side-Channel Leakage Free Coprocessor IC in 0.18pm CMOS for Embedded AES-based Cryptographic and Biometric Processing," DAC 2005, Jun. 13-17, 2005, Anaheim, California, USA.

Barenghi et al., "Smart Metering in Power Grids: Application Scenarios and Security," Innovative Smart Grid Technologies Asia (ISGT), 2011 IEEE PES (PES).

Bennett et al., "Decreased Time Delay and Security Enhancement Recommendations for AMI Smart Meter Networks," Innovative Smart Grid Technologies (ISGT), 2010.

Securing the Smart Meter, Application Note 5337, Maxim Integrated Products, Feb. 24, 2012.

Coalton Bennett et al., Decreased Time Delay and Security Enhancement Recommendations for AMI Smart Meter Networks, IEEE 2010.

Patrick McDaniel et al.,Security and Privacy Challenges in the Smart Grid, IEEE May/Jun. 2009.

* cited by examiner

1900 → If Estimated SC t+1 > SCt + Δ
1902 → Shift offline tasks to t+2
1904 → Scale task activity down such that SC t+1 <SCt + Δ
1906 → If Estimated SCt+1 < SCt - Δ
1908 → - Shift Offline tasks from (>t+2) to (t+1)
1910 → - Scale task activity up such that condition is met

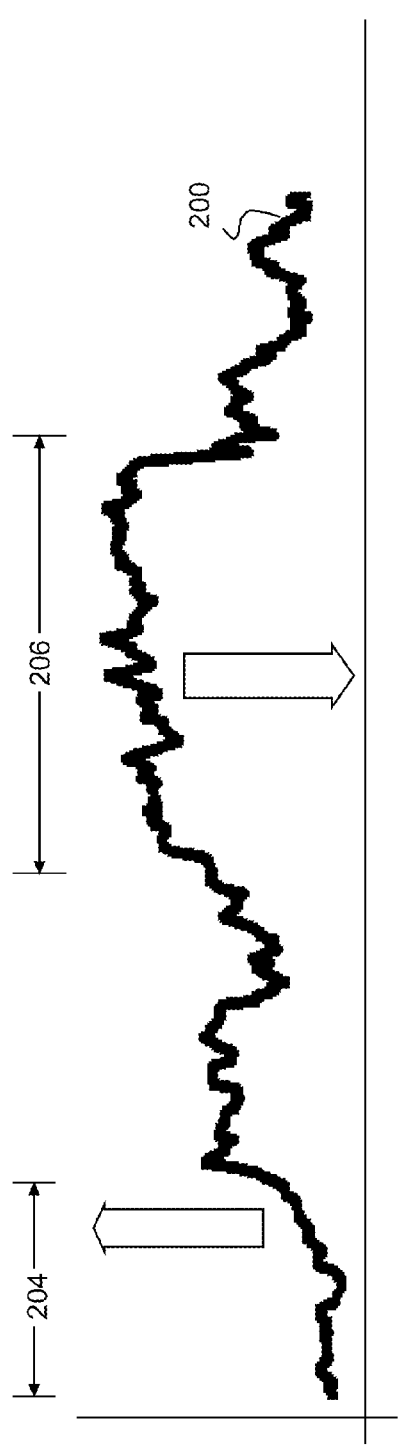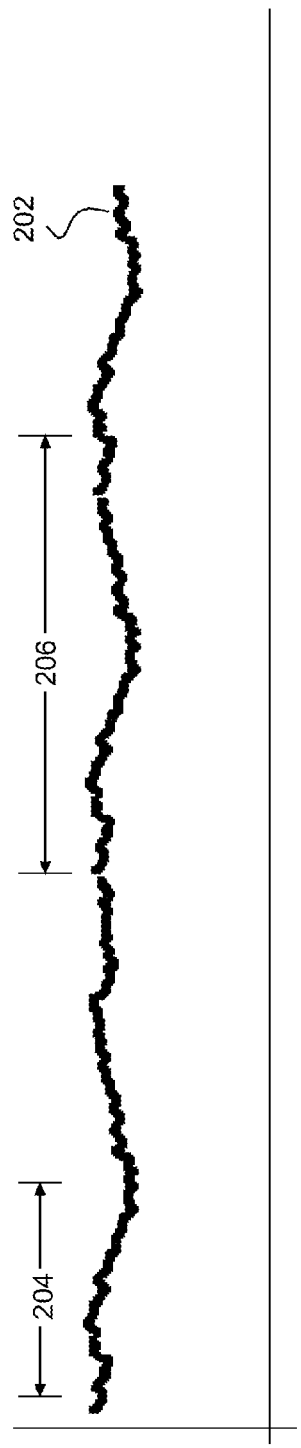

ENDPOINT LOAD REBALANCING CONTROLLER

CROSS REFERENCE TO RELATED APPLICATION

The present invention is related to U.S. patent application Ser. No. 14/036,175, "SMART METER SECURITY SYSTEM AND METHOD" to John M Cohn et al., filed coincident herewith, assigned to the assignee of the present invention and incorporated herein by reference.

BACKGROUND OF THE INVENTION

1. Field of the Invention

The present invention is related to information security and more particularly to differential power analysis and other side channel attacks (SCA).

2. Background Description

Increasingly, utility companies are deploying endpoint monitoring devices, known as smart meters, grid health sensors, and data concentrators, that monitor local endpoint power consumption and periodically report usage. As of 2010 there were eight (8) million smart meters deployed with as many as sixty (60) million expected to be deployed by 2020. Security and privacy is of great concern both personally and in the business-place. Consequently, smart endpoint devices have become security attack targets. Utility companies have employed encryption based design techniques to provide some security for smart meter communications.

So for example, to prevent brute force security attacks on smart grid endpoints, some state of the art designs have incorporated encryption standardized in Advanced Encryption Standard (AES), e.g., AES-128,256. Some of these protection techniques are directed at preventing endpoint cryptographic key extraction. Others prevent reverse-engineering endpoint communication protocols. Since not all smart endpoint device communication is encrypted, providers have deployed meter reprogramming with embedded security technology, derived from financial transactions and government applications. Some embedded products have physical attack-detection mechanisms. Other embedded products rely on deployed logical techniques like lockable and encrypted, secure on-chip memories. Still other approaches rely on secure bootloaders that lock the endpoint device during manufacturing. Whenever financial or political incentives have aligned, however, someone has quickly developed some method, e.g., data mining technique, to exploit any available data.

In spite of employing these security measures, using smart meters has added privacy and security vulnerabilities to what are commonly known as side channel attacks, which may reveal key information in spite of security efforts. For example, a smart meter may store or cache energy use information before reporting it to the service provider. State of the art smart meters monitor power consumption with a high resolution level, e.g., to the minute or even second. Stored information is an information-rich side channel, that characterizes customer habits and behaviors.

Some activities have detectable power consumption signatures, e.g., watching television. Even detecting the presence or absence of activity can provide some information. Side channel attacks frequently use energy profiling to extract available consumption signatures, and exploit vulnerabilities that are beyond protection with encryption. Typical energy profiling includes, for example, Differential Power Analysis (DPA) and Differential Electromagnetic Analysis (DEMA), and also invasive attacks (e.g. laser attacks). Information embedded in power consumption data, increasingly, has made utility companies a potential source of privacy abuse by side channel attackers. Consequently, side channel attacks have raised privacy and security concerns both for home and business and concern for side channel attack vulnerability has been increasing, not only from the customer information privacy perspective but also for enterprise applications.

Thus, there is a need for side channel attack security/prevention for protecting service facility infrastructure, and for focusing security on differential power and EM side channel attacks in smart meters and on preventing the attacks, and especially on smart meters metering and monitoring utility usage such as electricity, gas, water, fuel and other commodities.

SUMMARY OF THE INVENTION

A feature of the invention is improved prevention of usage data based security breaches;

Another feature of the invention is endpoint load rebalancing to protect from side channel attacks;

Yet another feature of the invention is suppression of endpoint differential power and EM information conveyed in side channel activity;

Yet another feature of the invention is endpoint monitoring and selective activity management to maintain endpoint load balance for preventing differential power and EM side channel attacks.

The present invention relates to a endpoint load rebalancing controller, method of controlling endpoint activity to suppress side channel variation and computer program product for controlling endpoint activity for suppressing side channel variation in information from utility company users, e.g., from power company endpoints. The load rebalancing controller monitors period to period endpoint service usage and predicts next period endpoint service usage. Whenever the controller maintains determines that the endpoint usage will exhibit a change that may be sufficient to convey activity information in side channel activity, the controller rebalances activity for the next period. Rebalancing may include shifting off-line execution from one period to another and capping or increasing on-line execution activity.

BRIEF DESCRIPTION OF THE DRAWINGS

The foregoing and other objects, aspects and advantages will be better understood from the following detailed description of a preferred embodiment of the invention with reference to the drawings, in which:

FIGS. 8A-B show an example of projected side channel activity, and as reordered and capped.

DESCRIPTION OF PREFERRED EMBODIMENTS

Figure 1:
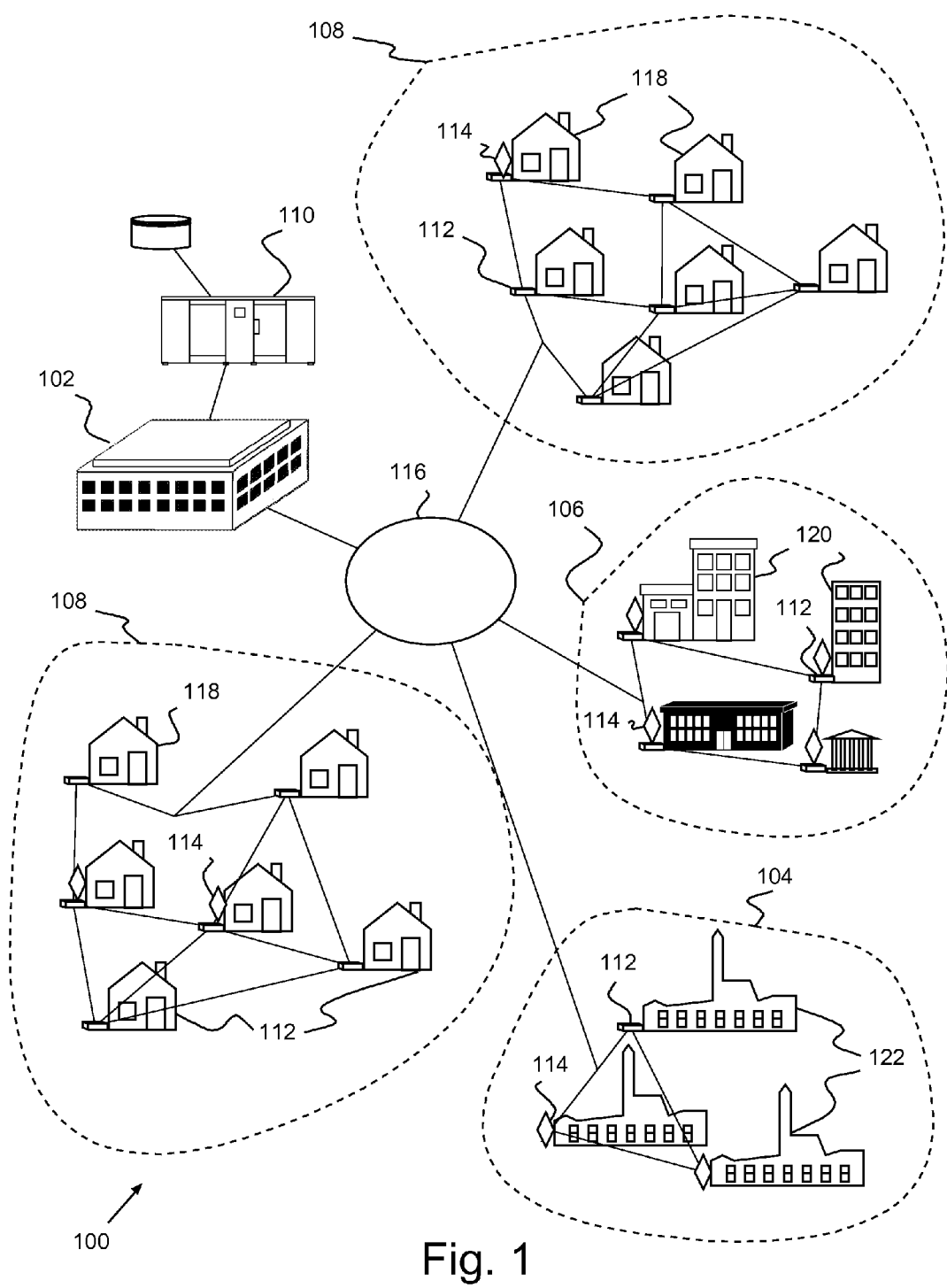
FIG. 1 shows an example of a typical location with area supplier infrastructure, e.g., power company infrastructure, serving the location, according to a preferred embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the drawings and more particularly, FIG. 1 shows an example of a typical location 100 with area supplier infrastructure, e.g., power company 102 infrastructure, serving the location 100. A typical location 100 as in this example includes industrial zones 104, commercial zones 106 and residential zones 108. Supplier infrastructure includes one or more computer 110 receiving local usage information from local smart meters 112. One or more units may include an on-board (and in some instances on-chip) rebalancing controller 114, alone or in combination with a local smart meter 112, monitoring and managing power grid 116 usage of supplier provided services, e.g., power used at individual residences 118, commercial consumption at office buildings 120 and industrial consumption at local plants 122.

Previously, side channel attackers created detailed profiling capabilities to exploit hidden information embedded in available high resolution usage data. Burglars could use energy profiling, for example, to extract information to determine a homeowners comings and goings, e.g., vacancies both daily (e.g., work schedules) and extended (e.g., vacations). Computer activity, for example, can vary depending on what tasks the computer is performing, e.g., whether the computer is number crunching or idle. A typical state of the art processor (and computer) uses much more power when it is active than when it is idle. Determining that difference can reveal activity that is not otherwise intended to be public. Accordingly, differential power and electromagnetic (EM) attacks collecting side-channel (power usage) data over long periods of time and have been successful in extracting signatures that reveal key information on both processing activity and data.

An industrial spy could have used energy profiling to extract activity signatures for more serious implications for an enterprise customer. The spy could use the business's power dissipation profile(s) to reveal critical information on enterprise activity, even minute to minute activity. For example, using the proper analysis tools, one can extract critical information buried in a bank's power usage, information such as trading scheme timing, trading duration, trading activity start and end, and trading patterns. Power dissipation and EM patterns may hold key manufacturing process information, trading algorithms and/or security vulnerability. If, a side-channel attacker identifies daily/weekly activity patterns an attacker can, for example, customize attacks to the activity patterns.

Thus, a preferred on-chip, or on-board rebalancing controller 114, with or without a cooperating the smart meter 112, rebalances activity and controls local activity to cap minimum and maximum detectable activity levels according to a preferred embodiment of the present invention. In particular, a preferred rebalancing controller 114 reads hardware activity counters regularly, rebalancing and capping activity levels for communications patterns, power usage, processing activity and anything else a particular user may specify, thereby preventing energy profiling and side-channel attacks.

It is understood that although described for smart meters monitoring power usage, the present invention has application to data concentrators and other units for collecting metered information; and, anywhere that side channel attack vulnerabilities pose a threat to information security, personal, private and/or public. Moreover, the present invention has application beyond electric (smart) grids and related components, such as for metering and monitoring gas, water, fuel or other commodities.

Figure 2:
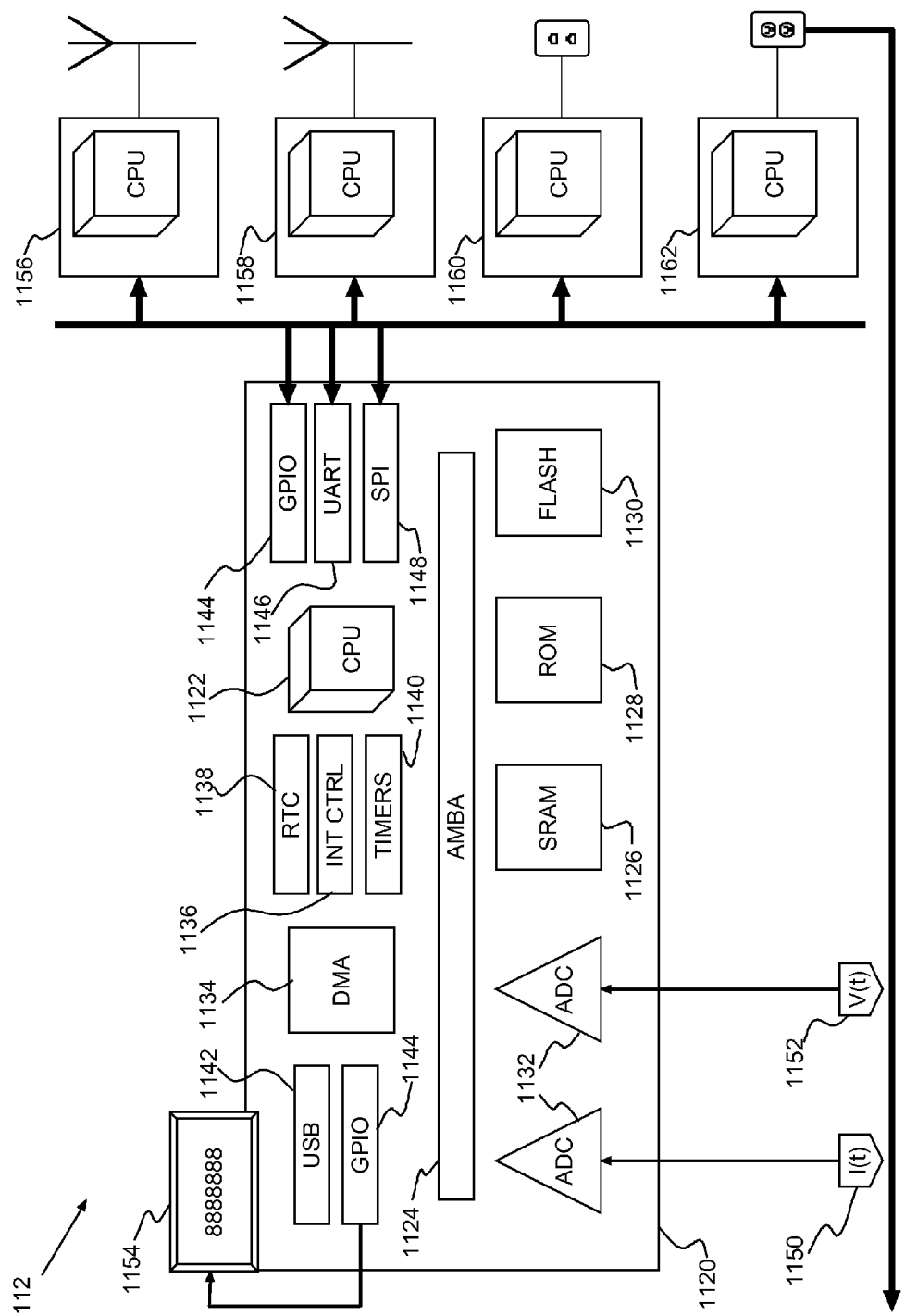
FIG. 2 shows an example of a block diagram example of a preferred smart meter, which may be paired with or include a preferred on-board controller, e.g., as a system on a chip.

FIG. 2 shows a block diagram example of a preferred smart meter 112, which may be paired with or include a preferred rebalancing controller 114, e.g., as a system on a chip 1120. Preferably, the core chip 1120 is based on an Advanced Reduced Instruction Set Computer (RISC) Machines (ARM) processor 1122 using Advanced Microcontroller Bus Architecture (AMBA) 1124 for on-chip functions communications. In addition a preferred chip 1120 may include, for example, storage 1126, 1128, 1130, analog to digital converter (ADCs) 1132, a micro direct memory access (µDMA) controller 1134, an interrupt controller 1136 and timing 1138, 1140 and various input/output (I/O) controllers/ports 1142, 1144, 1146, 1148.

In this example, the storage includes random access memory (RAM) 1126, read only memory (ROM) 1128 and flash memory 1130, storing instructions, data and generic power usage patterns as appropriate. The RAM 1126, preferably, is static RAM (SRAM). Timing includes a real time clock (RTC) 1138 and general-purpose timers 1140. The I/O ports in this example include a universal serial bus (USB) port 1142, two (2) general-purpose I/O (GPIO) ports 1144, a universal asynchronous receiver/transmitter (UART) 1146 and a system packet interface (SPI) 1148.

A current sensor 1150 senses local current use and a voltage sensor 1152 senses local voltage fluctuations. Each of the sensors 1152 is connected to an ADC, with data from both used for determining power local power use. A local display 1154, e.g., a seven (7) digit liquid crystal diode (LCD) display, indicates instantaneous power consumption. Communications processors, e.g., suitably enabled ARM processors, provide local and external communications capabilities and may be on the same chip 1120 or, as in this example, capabilities separate from the system chip 1120. Thus, in this example, communications include a wireless local area network (WLAN or WiFi) capability 1156, a Zigbee data communications capability 1158, a cellular or wired modem capability 1160 and/or a power line network capability 1162.

Figure 3A:
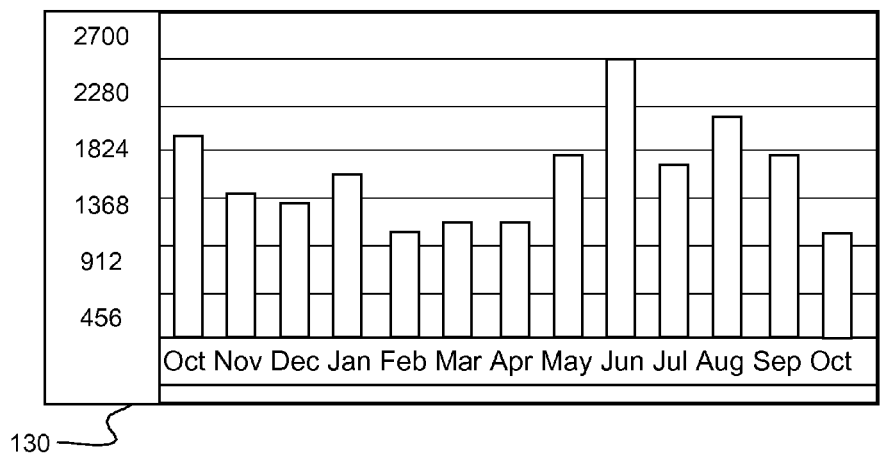
FIGS. 3A-D show an example of raw customer data and reported data.
Figure 3B:
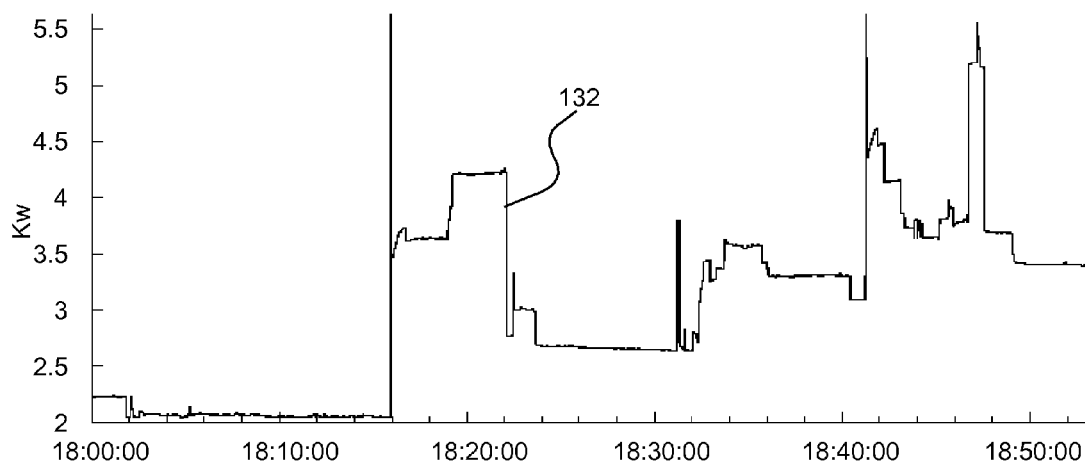
Figure 3C:
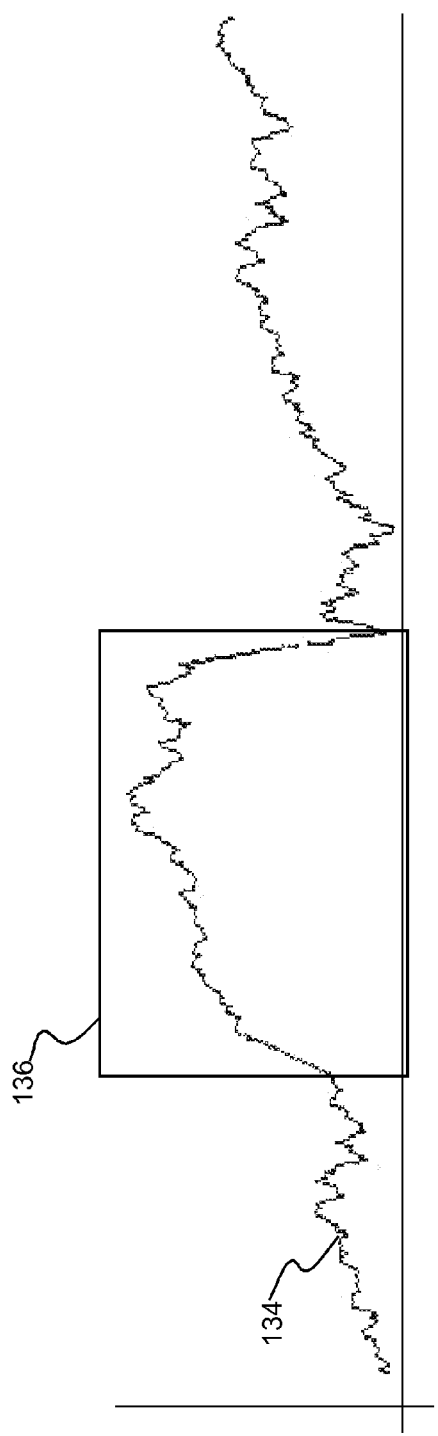
Figure 3D:
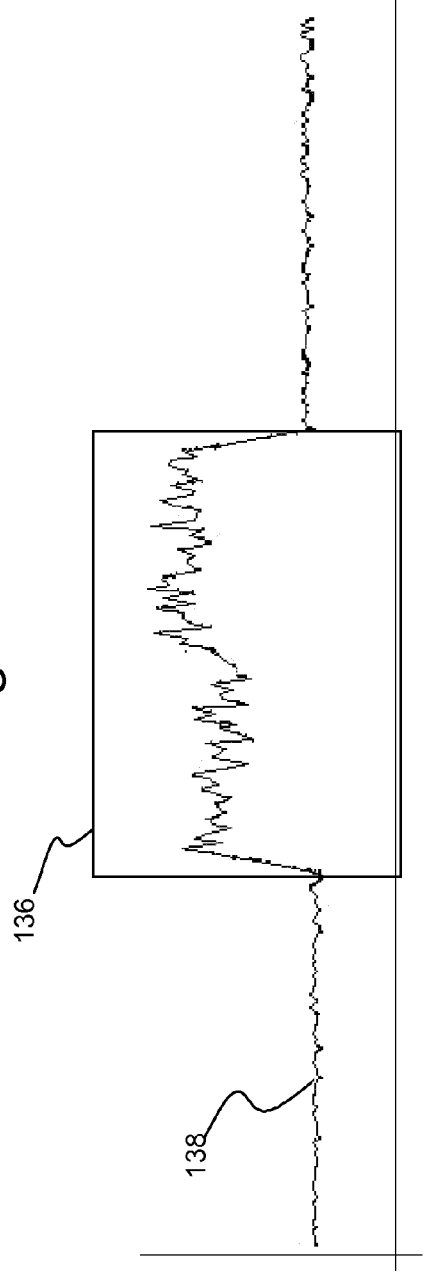

FIGS. 3A-D show an example of raw customer data and reported data. Thus, FIG. 3A shows an example of a customer consumption report 130 provided from a power company indicating cumulative monthly power consumption in kilowatt hours (kWh). As shown in FIG. 3B, however, a preferred smart meter, e.g., 112, may measure 132 instantaneous power use, typically sampling power (kW) minute by minute. So as shown in FIG. 3C, end node consumption data 134 collected, e.g., from a bank, by a smart meter may have some ambient level, with server power being observable during peak trading periods 136. Moreover, that server power may be extracted 138 from the raw data as shown in FIG. 3D.

Thus, a side channel attacker can determine server activity from the raw data. By observing the beginning of the critical activity in smart metered power patterns or by observing equipment close to the end-node, activity patterns may indicate, for example, a trading activity period in the bank. An attacker can determine, for example, the bank's schedule and trading patterns, e.g., trading between 9:15-10:00 am and 2-3 pm. Encryption, as well as other standard protection techniques, have provided inadequate protection for shielding against this kind of attack, but are not suitable for protecting against differential power and EM attacks.

Figure 4:
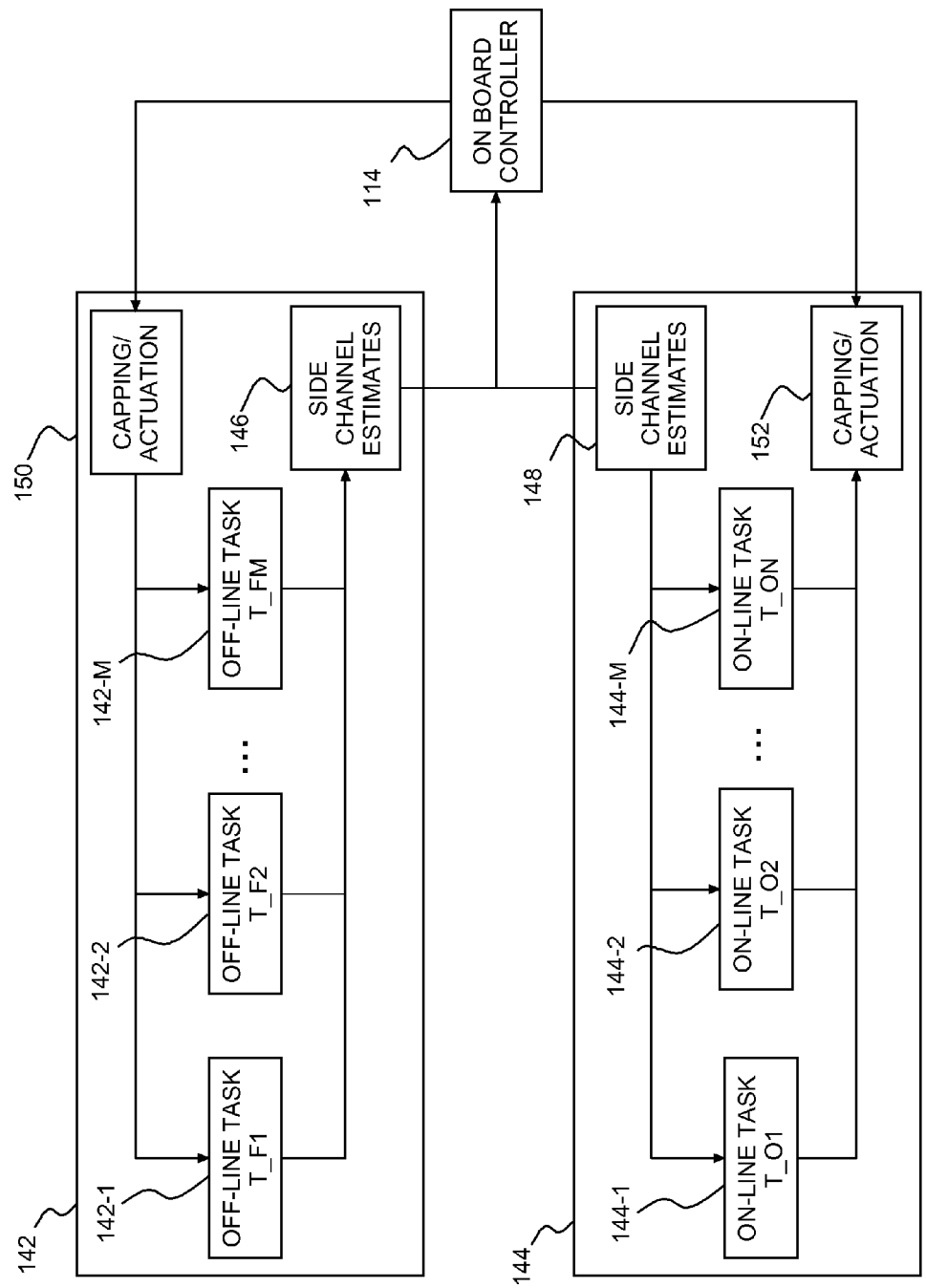
FIG. 4 show an example of a preferred on-board side channel controller controlling site operations according to a preferred embodiment of the present invention.

However, FIG. 4 shows an example of a preferred rebalancing controller 114 controlling site operations 140 to attenuate side channel variation for protecting against differential power and EM attacks according to a preferred embodiment of the present invention. In a typical endpoint some operations 142 occur in real time or on-line 142-1, 142-2, . . . , 142-M, and other operations 144 occur in the background or off-line 144-1, 144-2, . . . , 144-N. Each task and local operating unit provides, or is associated with, a side channel activity estimate 146, 148, e.g., in a unit-level hardware profile table and a task profile table. The side channel activity estimates 146, 148 may include, for example, power, activity, EM and temperature for each task and unit. The preferred rebalancing controller 114 checks ongoing and projected location activity 146, 148 to identify when activity exceeds selected thresholds and/or when side channel activity exceeds selected limits. Based on periodic activity results, the preferred rebalancing controller 114 performs local load balancing and caps task decisions to selectively shift task activity 150, 152 between monitoring periods to obfuscate activity from side channel attacks.

Activity balancing and capping 150, 152 may start when any activity, unit level activity or overall activity, causes usage to rise above, or fall below, specified usage thresholds, e.g., to a level sufficient that a side channel attacker could extract information on the activity by monitoring usage information. During balancing and capping 150, 152, the rebalancing controller 114 uses power feedback information from location activity 146, 148 to reassign and/or reorder activity, both off-line 142 and on-line 144 activity. The rebalancing controller 114 reassigns and adjusts activity 142, 144 to minimize period to period power fluctuations and avoid detectable behavior within operation thresholds. Preferably, the rebalancing controller 114 limits period to period power fluctuations in unit and total power to normalize activity reflected in EM and thermal profiles. If the preferred rebalancing controller 114 is deployed with smart meter 112, the rebalancing controller 114 may communicate critical activity to the smart meter 112, further shielding endpoint communications and smart meter inputs/outputs (IOs).

Figure 5A:
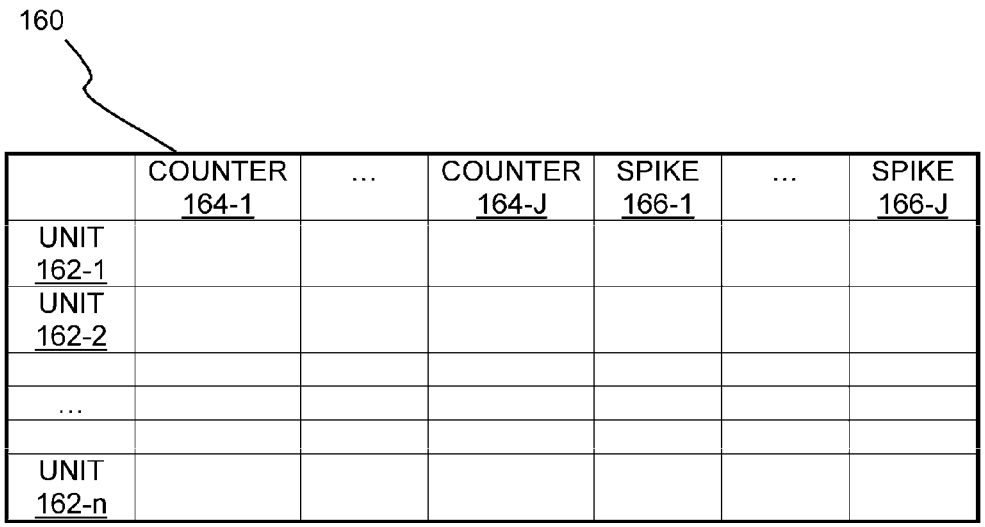
FIGS. 5A-B show an example of a global activity table and a task profile table used for estimating unit and overall side channel spike for individual tasks.
Figure 5B:
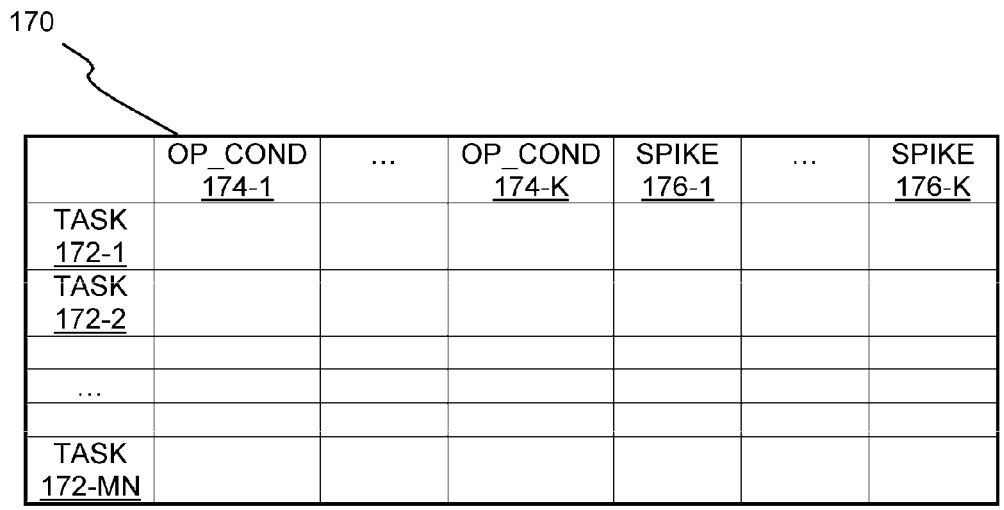

FIGS. 5A-B show an example of a global activity table 160 and a task profile table 170 used for estimating unit and overall side channel spikes for individual tasks and overall. The global activity table 160 includes unit-level hardware profiles with an entry for each local unit 162-1, 162-2, ..., 162-n. Each unit entry 162-1, 162-2, ..., 162-n includes a length for each of Jon-line and off-line tasks 164-1-164-J and an estimated side channel spike 166-1-166-J for each respective task. Similarly, the task profile table 170 includes an entry for every task 172-1, 172-2, ..., 172-M/N (for M off-line tasks and N on-line tasks). Each task entry includes K operating conditions 174-1-174-K and an estimated side channel spike for each respective operating condition 176-1-176-K. If the configuration in the global activity table 160 indicates that activity or inactivity causes usage to fall out of preselected limits, e.g., spike above a maximum activity threshold, or below a minimum activity threshold, the rebalancing controller 114 adjusts, and scales, unit and/or local activity to even out spikes, thereby minimizing any information that might otherwise be revealed.

Figure 6:
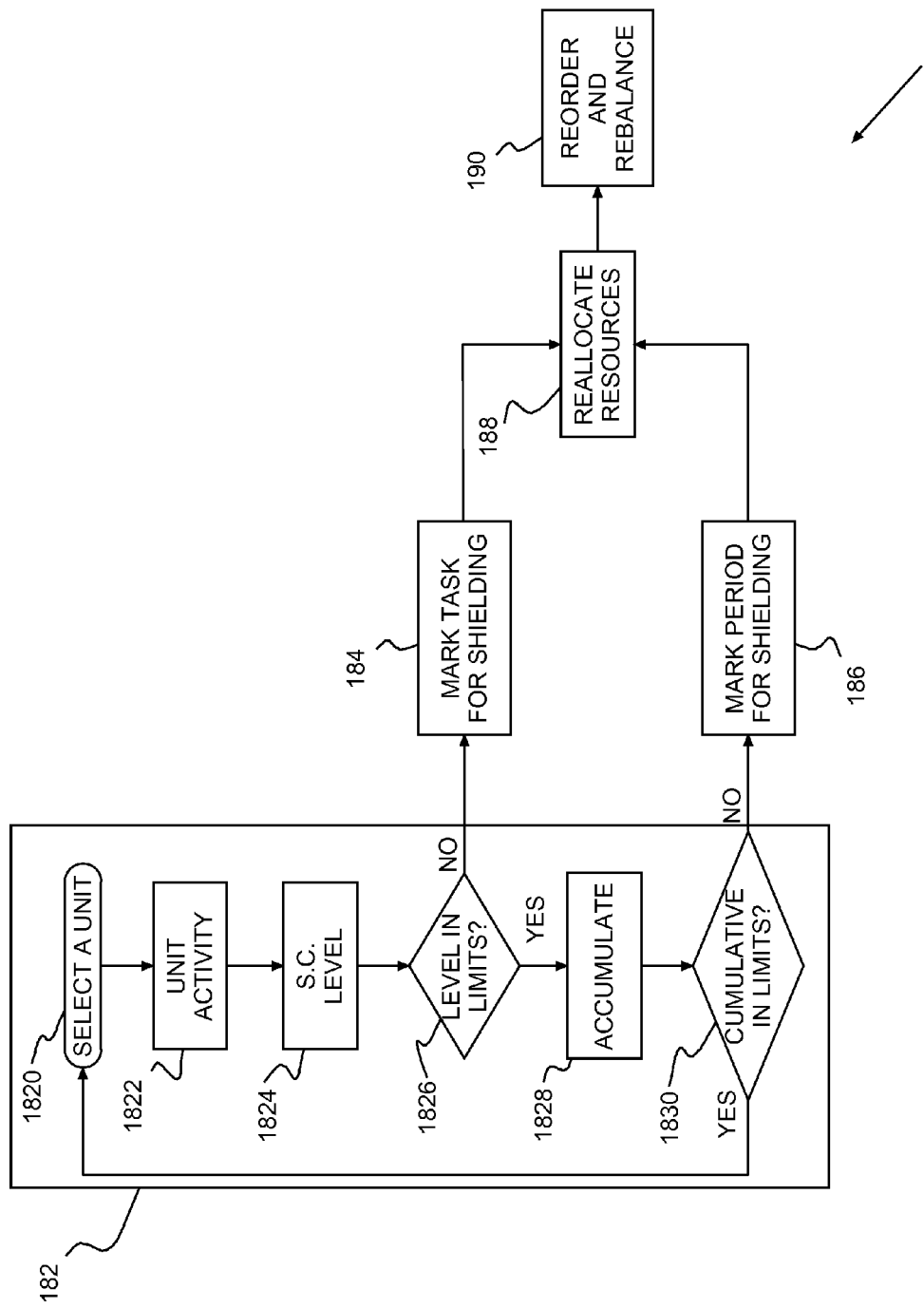
FIG. 6 shows an example of a operation of a preferred on-board side channel controller controlling site operations.

FIG. 6 shows an example of a operation 180 of a preferred rebalancing controller 114 controlling endpoint operations (140 in FIG. 4) according to a preferred embodiment of the present invention. The preferred rebalancing controller 114 monitors usage 182 for ongoing and projected location activity 146, 148 until usage for individual unit activity rises above, or falls below, preselected minimum and maximum (Min-Max) limits; or, usage for collective activity rises above, or falls below, preselected min-max limits. Whenever endpoint usage causes side channel activity to vary from the preselected min-max limits, the preferred rebalancing controller 114 controls hardware and software collaboratively, dynamically leveraging task characteristic information and detailed hardware characteristics to rebalance endpoint activity, adjusting usage to suppress discernable/discoverable side channel activity.

So when usage for individual unit activity is not between the preselected limits, the rebalancing controller 114 marks 184 unit activity for side channel shielding; and, when usage for collective activity is not within the limits, the rebalancing controller 114 marks 186 overall activity for side channel shielding. Next the rebalancing controller 114 reallocates resource configurations 188 to rebalance projected load and updates the location activity table with the results. Then, the rebalancing controller 114 reorders activity 190 based on that reallocation, both on-line task 142-1, 142-2, ..., 142-M and off-line task 144-1, 144-2, ..., 144-N execution, and caps resulting activity as necessary to reduce usage variation between monitoring periods.

Monitoring usage 182, the rebalancing controller 114 iteratively selects 1820 each unit (i) from the n units, and reads the activity level 1822 for the selected unit. The rebalancing controller 114 estimates 1824 side channel activity (e.g., power usage levels) for the selected unit. Then, the rebalancing controller 114 checks 1826 whether the estimated side channel activity is within the preselected min-max limits (e.g., Max Activity Threshold ATU_mx, Min Activity Threshold ATU_mn). If not, the rebalancing controller 114 marks unit activity 184 for side channel shielding, rebalances 188 and reconfigures 190. Otherwise, the rebalancing controller 114 updates 1828 an accumulated side channel activity usage total for all tasks in all units. The rebalancing controller 114 checks 1830 whether the accumulated estimated usage is within the preselected cumulative min-max limits (e.g., Activity Threshold ATU_Cmx, Activity Threshold ATU_Cmn). If not, the rebalancing controller 114 marks cumulative activity 186 for side channel shielding, rebalances 188 and reconfigures 190. Otherwise, the rebalancing controller 114 begins the next iteration selecting 1820 another unit and reading activity usage level 1822.

Figures 7A, 7B:
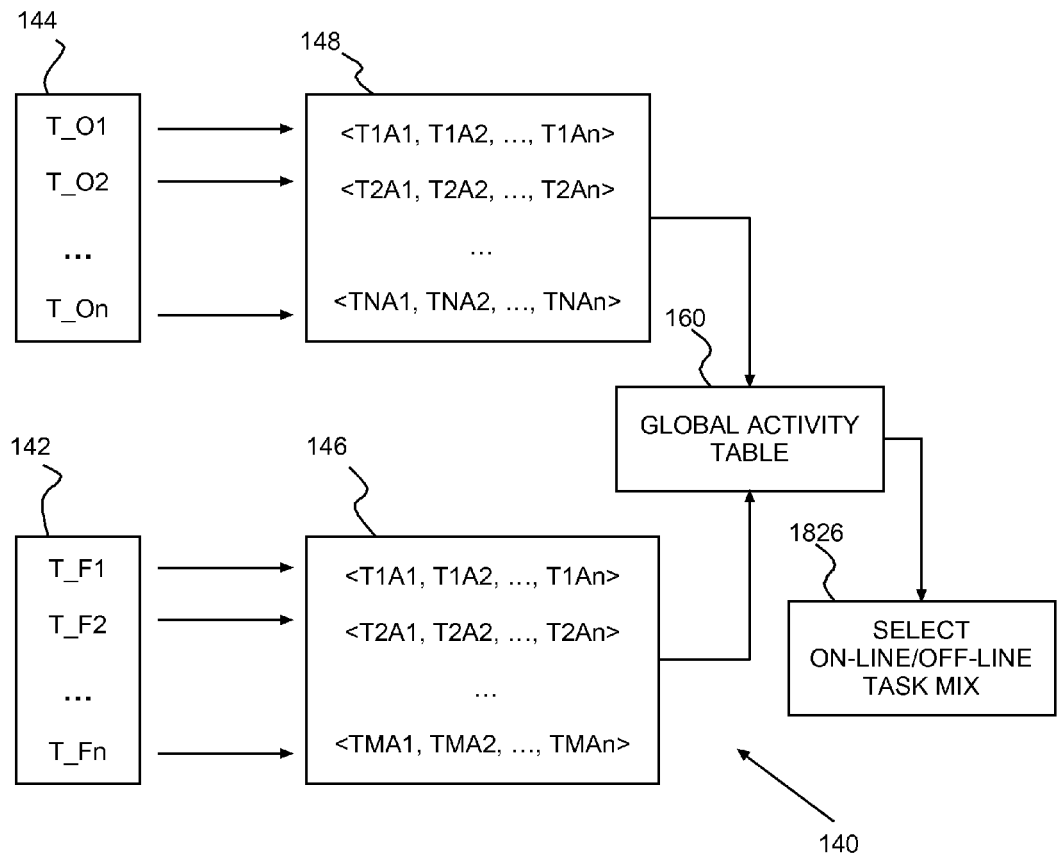
FIG. 7A shows an example of projecting side channel activity.
FIG. 7B shows an example of pseudo-code for reallocating, capping and reordering on-line and off-line task execution.

FIG. 7A shows an example of predicting side channel activity from endpoint usage (1824 and 1828 of FIG. 6); and, FIG. 7B shows an example of pseudo-code for reallocating 188, reordering and capping 190 on-line and off-line task execution with reference to controlling endpoint operations 140 in FIG. 4, and with like features labeled identically. As noted hereinabove, the rebalancing controller 114 estimates 1824 side channel activity (A) for every task (T) for each unit of the n units (U1, U2, ..., Un), to estimate 146, 148 activity level vectors for both on-line and off-line tasks (e.g., <T1A1, T1A2, ..., T1An>, <T2A1, T2A2, ..., T2An>, ..., <TNA1, TNA2, ..., TNAn> or <TMA1, TMA2, ..., TMAn>) for reallocating resources 188. Reallocating resources 188 may include, for example, allocating voltage and frequency resources to minimize estimated side channel risks, for example, from spikes in side channel activity level. From these estimates the rebalancing controller 114 updates the global activity table 160 and determines 1826 from the updated table 160 whether the estimated side channel activity for the unit is within the preselected Min-Max limits. The rebalancing controller 114 also determines the accumulated side channel activity 1828 for all tasks in all units from the updates. Further, the rebalancing controller 114 rebalances endpoint/unit activity, e.g., based on predicted side channel voltage and frequency, and caps and reorders execution 190 based on the updated table 160.

Preferably, as shown in FIG. 7B, the rebalancing controller 114 begins reordering and capping 190 by selecting a task mix to minimize the changes in side channel activity in sequential monitoring periods, where time (t) is measured in discrete periodic units, e.g., whole seconds, minutes, tens of minutes, hours or days. After selecting a task list (1820 in FIG. 6) with on-line and off-line tasks, the rebalancing controller 114 estimates side channel activity (SC) 1822 to determine expected/projected side channel activity 1824 for the next period ($SC_{t+1}$).

The rebalancing controller 114 checks 1900 whether the projected activity in next period indicates an increase over current activity by some threshold ($\Delta$). If the estimated change indicates an activity increase that is too large (i.e., $SC_{t+1} > SC_t + \Delta$), then the rebalancing controller 114 delays 1902 one or more off-line tasks to the following period (t+2). After delaying off-line tasks 1902, if necessary, the rebalancing controller 114 reduces or scales down 1904 rebalanced activity to reduce the period to period change below the threshold.

Similarly, the rebalancing controller 114 checks 1906 whether the projected activity in next period indicates a decrease from current activity beyond the threshold. If the estimated change indicates too large of a decrease in activity (i.e., $SC_{t+1} > SC_t - \Delta$), then the rebalancing controller 114 advances 1908 one or more off-line tasks to the next period from later following period(s), i.e., from (>t+2) to (t+1). After advances delaying on-line tasks 1908, the rebalancing controller 114 increases or scales up 1910 remaining activity to reduce the period to period change below the threshold.

FIGS. 8A-B show an example of projected side channel activity 200, and as reordered and capped 202 by a preferred rebalancing controller. At interval 204 projected activity is below the minimum side channel threshold. The rebalancing controller 114 reorders execution to start off-line tasks and scale up activity for on-line tasks. Later, at interval 206 projected activity is projected to rise above the maximum side channel threshold. The rebalancing controller 114 reorders execution to suspend off-line tasks and scale down activity for on-line tasks. Thus, the side channel activity 202 from reordering and capping exhibits no discernable activity footprint.

Advantageously, the present invention focuses on managing local resource usage to frustrate differential power and electromagnetic (EM) attacks, securing from side channel attacks both to, and independent of, smart meters. The present invention is compatible with existing data encryption services and devices to add protection from side channel attacks. Because a preferred rebalancing controller performs selective localized load balancing, even breaking an encryption key does not provide access to power information and patterns, reducing service provider customers' vulnerability to a nefarious side channel information tapping. Because endpoint power is free from wide usage swings and spike, there are no discernable usage pattern changes and side channel attackers cannot detect periods of high endpoint activity or inactivity. Since side channel attackers continually observe a normalized usage pattern, even during periods of higher on-line activity, the attackers have little motive for expending efforts for more in-depth side channel observations. Even so, the provider receives complete, albeit normalized usage data, securely transmitted for better managing and supplying provider capabilities and services, e.g., over a smart grid.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A security method for protecting service usage information comprising:
    monitoring service usage at an endpoint, a processor monitoring service usage; said processor further
    projecting endpoint service usage for a next monitoring period;
    determining whether projected usage indicates an activity change;
    marking projected activity for shielding responsive to an indicated activity change;
    modifying service usage projected for said endpoint in said next monitoring period; and
    returning to monitoring service usage.

2. A security method as in claim 1, further comprising said processor comparing projected service usage against current monitored service usage, wherein activity changes are indicated to said processor by the comparison indicating a projected usage difference in excess of a selected threshold.

3. A security method as in claim 1, further comprising said processor comparing projected service usage against current monitored service usage, wherein activity changes are indicated to said processor by the projected usage being outside of selected usage limits.

4. A security method as in claim 1, wherein service usage comprises resources for on-line and off-line endpoint activity during a monitoring period.

5. A security method as in claim 4, wherein when indicated activity changes indicate an increase in activity, said method comprises:
    delaying off-line endpoint activity beyond said next monitoring period; and
    selectively capping on-line activity during said next monitoring period.

6. A security method as in claim 4, wherein when indicated activity changes indicate a decrease in activity, said method comprises:
    advancing off-line endpoint activity to said next monitoring period from a subsequent monitoring period; and
    selectively increasing on-line activity during said next monitoring period.

7. A security method as in claim 1, further comprising said processor comparing projected usage for each endpoint unit and comparing total projected endpoint usage, projected activity being marked for shielding responsive to indicated individual unit activity changes and to indicated total activity changes.

8. A security method as in claim 1, wherein said service usage is utility consumption, said method further comprising notifying a service provider of monitored utility consumption.

9. A security method as in claim 8, wherein said service provider is a utility company, said processor is a rebalancing controller processor communicating with a smart meter monitoring endpoint utility consumption, said smart meter communicating utility consumption to said utility company.

10. A security method as in claim 9, wherein said smart meter includes said rebalancing controller rebalancing utility consumption at said endpoint to mask endpoint activity indicated in utility consumption communicated to said utility company, such that endpoint activity is masked to unauthorized interception of endpoint communications to said utility company.

11. A method for protecting utility usage information from side channel attacks, said method comprising:
    monitoring utility usage at an endpoint, a processor monitoring service usage; said processor further
    projecting endpoint utility usage from on-line and off-line activity for a next monitoring period;
    comparing projected utility usage against current monitored utility usage;
    determining whether the comparison indicates a change in endpoint activity;
    marking projected activity for shielding responsive to an indicated change in endpoint activity;
    modifying on-line and off-line activity scheduled for said endpoint in said next monitoring period; and
    returning to monitoring service usage.

12. A method as in claim 11, wherein changes in endpoint activity are indicated to said processor by the comparison indicating a projected utility usage difference in excess of a selected threshold.

13. A method as in claim 11, wherein changes in endpoint activity are indicated to said processor by the comparison indicating a projected utility usage being outside of selected usage limits.

14. A method as in claim 11, wherein when the comparison indicates a increase in endpoint activity, said method further comprises:
    delaying off-line endpoint activity beyond said next monitoring period; and
    selectively capping on-line activity during said next monitoring period.

15. A method as in claim 11, wherein when the comparison indicates a decrease in endpoint activity, said method further comprises:
    advancing off-line endpoint activity to said next monitoring period from a subsequent monitoring period; and
    selectively increasing on-line activity during said next monitoring period.

16. A method as in claim 11, wherein comparing projected utility usage comprises said processor comparing projected usage for each endpoint unit and comparing total projected endpoint usage, projected activity being marked for shielding responsive to indicated individual unit activity changes and to indicated total activity changes.

17. A method as in claim 11, wherein said service provider is a power company, said processor is a rebalancing controller processor communicating with a smart meter monitoring endpoint power consumption, said smart meter communicating power consumption to said power company.

18. A method as in claim 17, wherein said smart meter includes said rebalancing controller rebalancing utility consumption at said endpoint to mask endpoint activity indicated in utility consumption communicated to said utility company such that endpoint activity is masked to side channel attacks.

19. A security method for protecting utility usage information communicated from an endpoint smart meter to a utility company, said security method comprising:
   sensing utility company service usage at an endpoint, an endpoint smart meter sensing endpoint service usage;
   monitoring service usage at said endpoint, a rebalancing controller monitoring service usage, said rebalancing controller further
      projecting endpoint service usage for a next monitoring period,
      determining whether projected usage indicates an activity change,
      marking projected activity for shielding responsive to an indicated activity change,
      modifying service usage projected for said endpoint in said next monitoring period, modified projected service usage masking projected usage; and
      communicating modified power consumption to said smart meter, and
   returning to monitoring service usage, said smart meter communicating masked projected service to said utility company.

20. A security method as in claim 19, wherein determining whether projected usage indicates an activity change comprises comparing endpoint projected service usage against current monitored endpoint service usage, activity changes being indicated by projected endpoint usage difference in excess of a selected threshold.

21. A security method as in claim 19, wherein determining whether projected usage indicates an activity change comprises comparing projected service usage against current monitored service usage, wherein activity changes are indicated by the projected usage being outside of selected usage limits.

22. A security method as in claim 19, wherein determining whether projected usage indicates an activity change comprises comparing projected usage for each endpoint unit and comparing total projected endpoint usage, projected activity being marked for shielding responsive to indicated individual unit activity changes and to indicated total activity changes.

23. A method for securing utility usage information communicated from an endpoint smart meter to a utility company, said method comprising:
   sensing utility usage at an endpoint, an endpoint smart meter sensing said utility usage;
   monitoring said utility usage at said endpoint, a rebalancing controller monitoring service usage, said rebalancing controller further
      projecting endpoint utility usage from on-line and off-line activity for a next monitoring period,
      comparing projected utility usage against current monitored utility usage,
      determining whether the comparison indicates a change in endpoint activity,
      marking projected activity for shielding responsive to an indicated change in endpoint activity,
      modifying on-line and off-line activity scheduled for said endpoint in said next monitoring period,
      communicating modified power consumption to said smart meter; and
   returning to monitoring service usage, said smart meter communicating modified power consumption to said power company.

24. A method as in claim 23, wherein modifying on-line and off-line activity comprises:
   adjusting off-line endpoint activity for said next monitoring period and beyond; and
   selectively adjusting on-line activity during said next monitoring period.

25. A security method as in claim 23, wherein determining whether projected usage indicates an activity change comprises comparing projected usage for each endpoint unit and comparing total projected endpoint usage, projected activity being marked for shielding responsive to indicated individual unit activity changes and to indicated total activity changes.

* * * * *